United States Patent [19]

Csonka

[11] Patent Number: 5,845,757
[45] Date of Patent: Dec. 8, 1998

[54] CENTRIFUGAL CLUTCH

[75] Inventor: Bela I. Csonka, Phoenix, Ariz.

[73] Assignee: Ryobi North America, Inc., Anderson, S.C.

[21] Appl. No.: 766,748

[22] Filed: Dec. 13, 1996

[51] Int. Cl.⁶ .............................. F16D 43/24; F16D 13/72
[52] U.S. Cl. ................ 192/105 BA; 192/76; 192/113.24
[58] Field of Search .................... 192/76, 113.24, 192/105 A, 105 BA

[56] References Cited

U.S. PATENT DOCUMENTS

| | | |
|---|---|---|
| 1,478,294 | 12/1923 | Patterson . |
| 1,866,291 | 7/1932 | Bryson .............................. 192/105 BA |
| 2,203,862 | 6/1940 | Eason . |
| 2,713,928 | 7/1955 | Pohl .................................... 192/105 A |
| 3,367,465 | 2/1968 | Newman . |
| 3,680,674 | 8/1972 | Horstman .............................. 192/70.14 |
| 3,810,533 | 5/1974 | Densow . |
| 4,657,128 | 4/1987 | Fujito et al. . |
| 4,756,396 | 7/1988 | Nagashima et al. . |
| 4,827,702 | 5/1989 | Cerreta . |
| 4,835,950 | 6/1989 | Cerreta . |
| 4,846,330 | 7/1989 | Takeuchi . |
| 4,886,153 | 12/1989 | Takenaka et al. . |
| 4,905,461 | 3/1990 | Heuer . |
| 4,960,194 | 10/1990 | Sageshima . |
| 4,984,669 | 1/1991 | Hoffman . |
| 5,632,365 | 5/1997 | Maucher .............................. 192/89.24 |

*Primary Examiner*—Charles A. Marmor
*Assistant Examiner*—Saul Rodriguez
*Attorney, Agent, or Firm*—Brooks & Kushman P.C.

[57] ABSTRACT

A centrifugal clutch is provided having a drive member having a rotor and at least one shoe which is radially displaceable as a result of centrifugal force. A clutch drum is oriented coaxially with the drive member having a circular or cylindrical portion for engaging the shoe. The clutch drum is provided with a central hub and an end wall extending between the central hub and the circular or cylindrical portion. The end wall is integrally formed of a sheet metal stamping provided with a plurality of fan blades circumferentially spaced about the central axis and integrally formed in the end wall by showing a radially extending slit into the end wall and bending the adjacent sheet metal axially outward to define a fan blade and an adjacent vent opening.

11 Claims, 2 Drawing Sheets

5,845,757

CENTRIFUGAL CLUTCH

TECHNICAL FIELD

The present invention relates to centrifugal clutches and more particularly to a clutch drum for a centrifugal clutch used on small, single cylinder internal combustion engines used in power tools.

BACKGROUND ART

Small operator carried power tools having an internal combustion engine such as line trimmers, leaf blowers and chain saws utilize a centrifugal clutch on the engine output to disengage the tool's implement when the engine speed is reduced to idle.

Centrifugal clutch assemblies are traditionally made up of a drive member which includes a rotor which is affixed to a rotary input such as a crank shaft. The drive member is provided with at least one shoe which rotates with the rotor and is radially displaceable thereto as a function of centrifugal force. A clutch drum is oriented coaxially with the drive member and provided with a cylindrical portion extending about the rotor and shoe. In a typical small power tool engine application, the clutch drum will be formed of a sheet metal stamping and further include a central hub and an end wall extending between the central hub and the cylindrical portion. The clutch drum may be pivotally mounted relative to the rotary power source utilizing a bearing which maintains clutch drum and axially aligned with the drive member.

The clutch drum is further provided with a power output which is typically an axial output for a flexible drive shaft or the like used in a line trimmer or a circumferential output such as a pulley sprocket or a gear in chain saws and lawn mowers.

Various representative clutch drum assemblies are found in the following U.S. Pat. Nos.: 3,367,465, 3,810,533, 4,960,194, 4,756,396 and 4,984,669.

SUMMARY OF INVENTION

It is an object of the present invention to enhance the cooling effectiveness of an air cooled centrifugal clutch.

It is a further object of the present invention to provide a low cost air cooled centrifugal clutch drum assembly.

Accordingly, a centrifugal clutch of the present invention is provided with a drive member which is rotatable about a central axis. The drive member includes a rotor coupled to a rotary power source and at least one shoe radially displaceable relative to the rotor as a result of the centrifugal force. A clutch drum is coaxially and rotatable mounted about the central axis for cooperation with the drive member. The clutch drum includes a cylindrical portion having an internal surface for engaging the shoe, a central hub and an end wall extending between the central hub and the cylindrical portion. The clutch drum end wall is formed of a sheet metal stamping having a plurality of fan blades circumferentially spaced about the central axis integrally formed in the end wall by radially shearing a slit in the wall and bending the adjacent sheet metal axially outward to define the fan blade and the a vent opening extending through the wall for inducing cooling air to flow through the vent openings as the clutch drum rotates.

BRIEF DESCRIPTION OF DRAWINGS

FIG. 3b is an alternative fan blade otherwise corresponding to FIG. 3a;

FIG. 4b and 4c are alternative fan blade shapes otherwise corresponding to FIG. 4a.

BEST MODES FOR CARRYING OUT THE INVENTION

Figure 1:
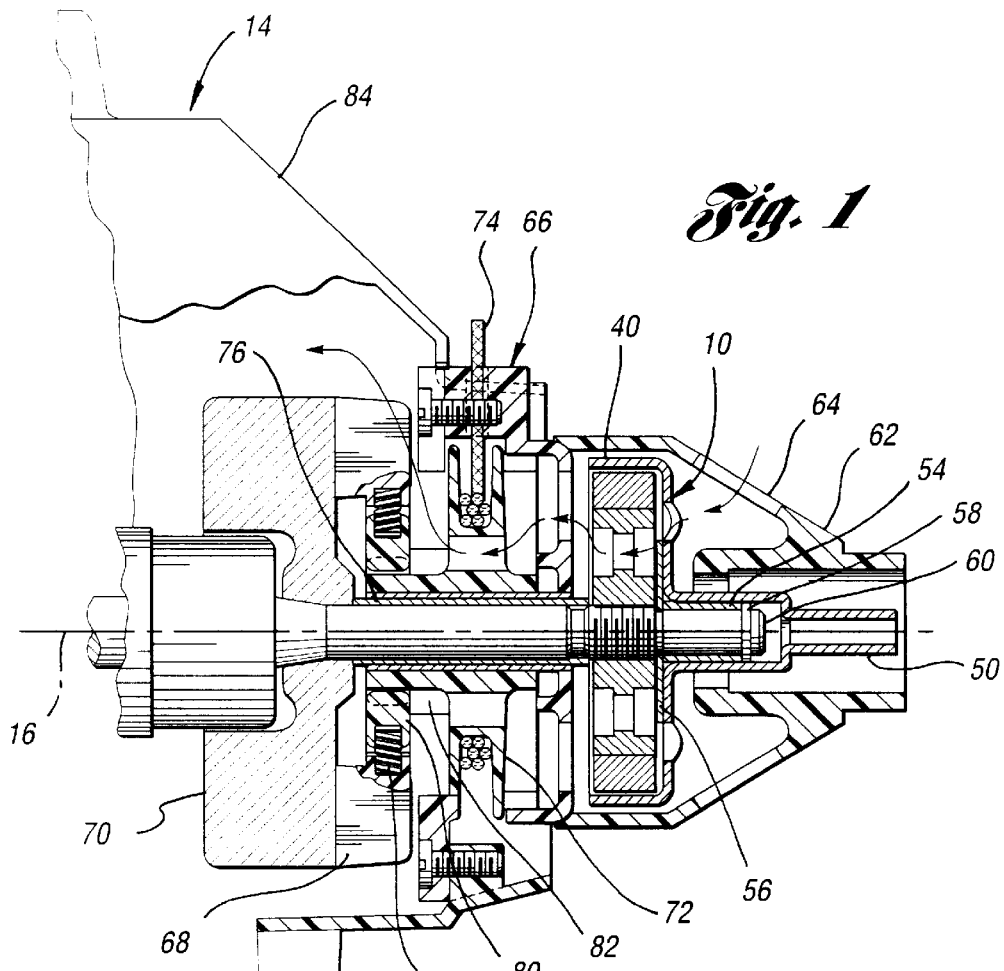
FIG. 1 is a cross-sectional cutaway view of an engine having a centrifugal clutch of the present invention mounted thereon.
Figure 2:
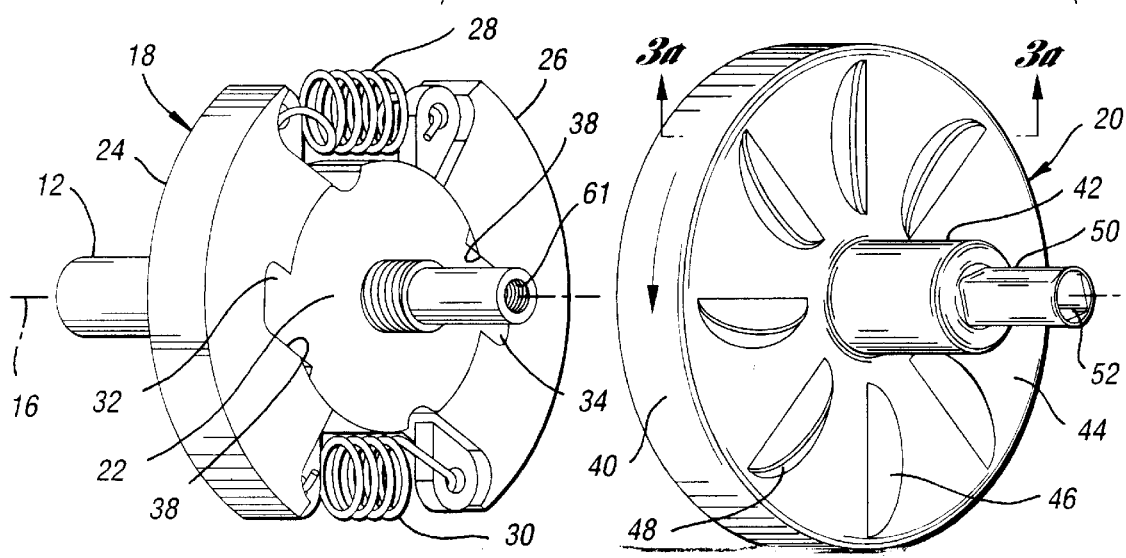
FIG. 2 is an exploded perspective view of the centrifugal clutch of the present invention.

A centrifugal clutch assembly 10 illustrating a preferred embodiment of the invention is shown in FIG. 1, 2, 3a and 4a. In FIG. 1, centrifugal clutch assembly 10 is shown attached to a rotary power source provided by crank shaft 12 extending from internal combustion engine 14. The crank shaft 12 and the attached centrifugal clutch assembly 10 rotate about central axis 16.

Centrifugal clutch assembly 10 is made up of two main components. A drive member 18 which is mounted on crank shaft 12 and a clutch drum assembly 20 which is coaxially aligned with central axis 16. Drive member 18 is made up of a rotor 22 which is affixed to and rotating with crank shaft 12. Mounted to a rotor 22 is at least one shoe cooperating with the rotor 22 and rotatable therewith about the central axis. In the embodiment illustrated, shoes 24 and 26 are rotatably driven by the rotor and are free to be radially displaced relative to rotor 22 a limited distance as a result of centrifugal force. Springs 28 and 30 bias shoes 24 and 26 radially inboard. While the springs are shown extending between opposed ends of shoes 24 and 26, alternative conventional designs in which the springs extend between the rotor and the shoe could be used.

In order to prevent the shoes from rotating relative to the rotor, the rotor is provided with a pair of outwardly extending ears 32 and 34. The shoes are respectively provided with slots 36 and 38 to facilitate radial outward movement of the shoes relative to the rotor while limiting free relative rotation about central axis 16.

The spring rate of springs 28 and 30 is selected relative to the mass and the radial orientation of shoes 24 and 26 in order to achieve the desired clutch engagement speed appropriate for the engine and power tool being driven. Of course, the amount of torque to be transmitted is also a design factor considered in selecting clutch size.

Clutch drum assembly 20 is provided with a circular cylindrical portion 40 having an internal surface. The internal surface has a diameter greater than the diameter of the outer peripheral surfaces of shoes 24 and 26 in their radially inward position to enable circular cylindrical portion 40 to freely rotate relative to drive member 18 when the crank shaft is rotated at a speed less than the engagement speed. Clutch drum assembly 20 is further provided with a hub 42 concentric with central axis 16 for pivotal cooperation with crank shaft 12. Extending between hub 42 and circular cylindrical portion 40 is a generally radially extending end wall 44. End wall 44 and circular cylindrical portion 40 are preferably integrally formed of a sheet metal stamping. End wall 44 is provided with a plurality of circumferentially spaced apart fan blades 46 integrally formed in the end wall. Preferably, the fan blades 46 are formed by shearing a radial extending slit in the end wall and bending the adjacent sheet metal axially outward to define fan blade 46 and an adjacent vent opening 48. The fan blades are of course, oriented relative to the vent opening so that when the centrifugal clutch assembly 10 is rotated by the engine, the fan blade 46 induces cooling air to flow into the vent opening axially through the centrifugal clutch 10 to cool the clutch drum 20 and the clutch shoes 24 and 26.

In the preferred embodiment illustrated, clutch drum assembly 20 is provided with an output member 50 which is generally tubular in nature and has a square drive socket 52 sized to receive a rotary output shaft. Preferably, circular cylindrical portion 40, hub 42 and end wall 44 are integrally formed of single metal sheet utilizing a progressive stamping or spin forming process. After forming the general stepped cylindrical shape, fan blades 46 are created by shearing a series of radial extending slits and the deforming of the end wall 44 adjacent the slits outward to create a fan blade 44 and associated vent opening 48.

In a preferred centrifugal clutch 10 illustrated in FIG. 1, mounted within the interior of hub 42 is a bushing 54 sized to enable the hub to freely rotate upon the associated end portion of crank shaft 12. Bushing 54 is retained by a retainer plate 56 spot welded to the end wall and provided with an aperture sized to receive the end of crank shaft 12 therethrough. To facilitate attachment of the clutch drum assembly 20 to crank shaft 12, a washer 58 and a screw 60 is provided as illustrated in FIG. 1. Washer 58 abuts the end of bushing 54 while screw 60 extends through washer 58 into a threaded aperture 61 formed in the end of crank shaft 12. Bushing 54 in combination with retainer plate 56, washer 58 and screw 60, axially position the circular cylindrical portion 40 of clutch drum assembly 20 radially outboard of the outer periphery of shoes 24 and 26.

In order to provide an air flow path through centrifugal clutch assembly 10, bell housing 62 which circumferentially surrounds centrifugal clutch assembly 10 is provided with a series of air inlets 64 to allow cooling air to enter as indicated by the arrows in FIG. 1. Air entering the housing through air inlet 64 are directed through vent openings 48 by fan blades 46. Once within circular cylindrical portion 40 air continues to flow axially through drive member 18. Air flowing through centrifugal clutch assembly 10 continues to flow axially through starter assembly 66 and is axially drawn into the centrifugal fan 68 affixed to fly wheel assembly 70.

Starter assembly 66 is a conventional design commonly used in small power tools. Of course, an electric starter can alternatively be used provided adequate air path is provided for the air flowing through centrifugal clutch assembly 10. Starter assembly 66 is provided with starter spool 72 about which starter cord 74 is wound. When the operator pull starts cord 74, the starter spool rotates about sleeve bearing 76 mounted on the periphery of the crank shaft 12. When the engine is stopped, springs 78 bias pawls 80 into engagement with projection 82 formed on starter spool 72. Once the engine starts, fly wheel assembly 70 will be rotating at sufficient speed to cause pawls 80 to outwardly shift compressing springs 78 and disengaging the starter spool from the crank shaft.

Air moving axially into centrifugal fan 68 along the central axis 16 will be radially displaced by the rotating centrifugal fan 68 and subsequently directed by engine housing 84 across the engine block cylinder and head assembly not shown to cool the engine.

Figure 3A:
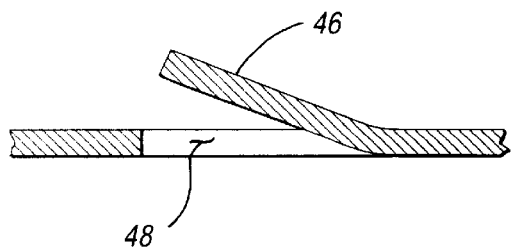
FIG. 3a is a cross-sectional view taken along line 3a—3a in FIG. 2.
Figure 3B:
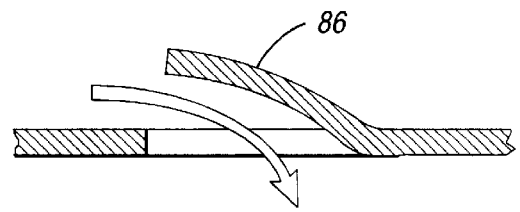
Figure 4A:
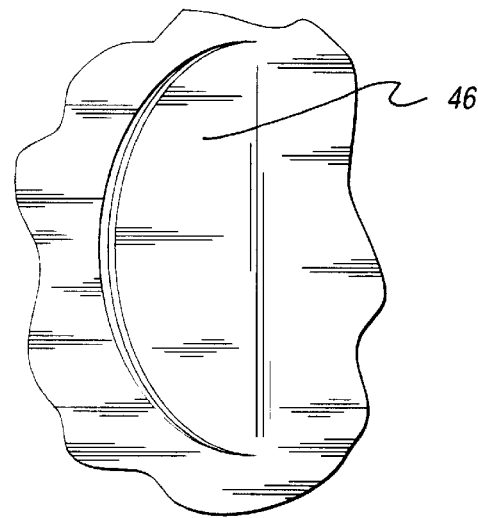
FIG. 4a is an enlarged view of a fan blade looking along the direction of the central axis.
Figure 4B:
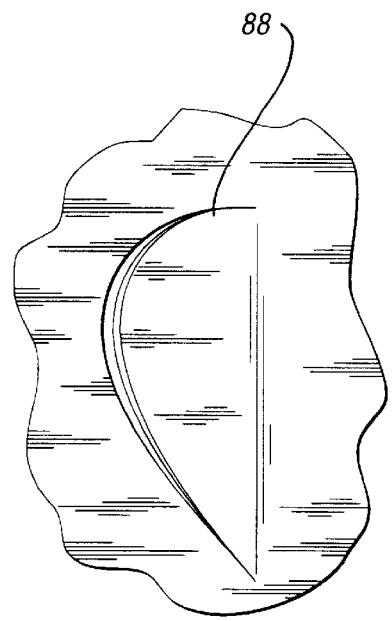
Figure 4C:
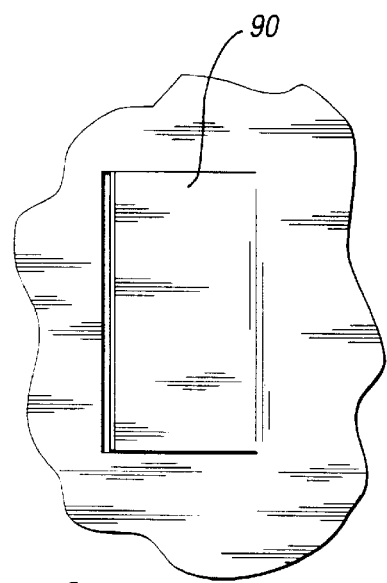

An enlarged detailed drawing of the fan blade 46 and corresponding vent opening 48 is shown in FIGS. 3a and 4a. Alternative fan blade 86 is shown in cross-section in FIG. 3b. Fan blade 86 has a curved cross-section to better axially direct the air flow passing therethrough. FIG. 4b and 4c illustrate alternative shape fan blades 88 and 90 having teardrop and rectangular profiles respectively. It should be appreciated that a fan blades 86, 88 and 90 illustrated are just a few examples of fan blades which can be constructed by one of ordinary skill in the art to achieve the desired air flow through the centrifugal clutch assembly.

While the best modes for carrying out the invention has been described in detail, those familiar with the art to which this invention relates will recognize various alternative designs and embodiments for practicing the invention as defined by the following claims.

What is claimed is:

1. A centrifugal clutch, comprising:

a drive member rotatable about a central axis, the drive member having a rotor to be driven by a rotary power source and at least one shoe cooperating with the rotor and rotatable therewith about the central axis, wherein the at least one shoe member is radially shiftable relative to the rotor as a result of the centrifugal force caused by the rotation of the drive member about the central axis;

a clutch drum coaxially aligned and rotatable about the central axis, the clutch drum having a circular cylindrical portion, an end wall and a central hub, the circular cylindrical portion oriented radially about and circumferentially extending around the rotor and the at least one shoe of the drive member, the circular cylindrical portion providing an inside surface which engages the at least one shoe coupling the drive member to the clutch drum when the drive member is rotated at sufficient speed to cause the at least one shoe to be urged radially outboard, the end wall extending radially inward from the circular cylindrical portion and connected to the central hub, the end wall and the circular cylindrical portion integrally formed of a sheet metal stamping;

the end wall provided with a plurality of fan blades circumferentially spaced about the central axis, each of the fan blades integrally formed in the end wall by shearing a radially extending slit in the end wall and bending the sheet metal adjacent one side of the slit axially outward; and a plurality of vent openings extending through the end wall, each of the vent openings defined by one of the slits and fan blades with the fan blade substantially covering the vent opening axially, wherein rotation of the clutch drum causes the fan blade to induce cooling air to flow through the slits between the end wall and fan blades and then through the vent openings.

2. The centrifugal clutch of claim 1 wherein said clutch drum circular cylindrical portion, end wall, central hub and plurality of fan blades are integrally stamped from a single metal sheet.

3. The centrifugal clutch of claim 1 wherein the fan blades are deformed axially outward of the end wall in a direction on the opposite side of the end wall as the circular cylindrical portion.

4. The centrifugal clutch of claim 3 further comprising a power output member affixed to and coaxially aligned with the central hub.

5. A clutch drum assembly for use in a centrifugal clutch drum along and rotatable about a central axis for cooperating with at least one shoe mounted upon a rotatable router, the clutch drum assembly comprising a circular cylindrical portion, an end wall and a central hub, the circular cylindrical portion oriented radially about and circumferentially extending around the rotor and the at least one shoe of the drive member, the circular cylindrical portion providing an inside surface which engages the at least one shoe coupling the drive member to the clutch drum when the drive member is rotated at sufficient speed to cause the at least one shoe to be urged radially outboard, the end wall extending radially inward from the circular cylindrical portion and connected to the central hub, the end wall and the circular cylindrical portion integrally formed of a sheet metal stamping, the end wall provided with a plurality of fan blades circumferentially spaced about the central axis, each of the fan blades integrally formed in the end wall by shearing a radially extending slit in the end wall and bending the adjacent sheet metal axially outward, a plurality of vent openings extending through the end wall, each of the vent openings defined by one of the slits and fan blades with the fan blade substantially covering the vent opening axially, wherein rotation of the clutch drum causes the fan blade to induce cooling air to flow through the slits between the end wall and fan blades and then through the vent openings.

6. The centrifugal clutch of claim 5 wherein said clutch drum circular cylindrical portion, end wall, central hub and plurality of fan blades integrally stamped from a single metal sheet.

7. The centrifugal clutch of claim 5 wherein the fan blades are deformed axially outward of the end wall in a direction on the opposite side of the end wall as the circular cylindrical portion.

8. The centrifugal clutch of claim 5 further comprising a power output member affixed to and coaxially aligned with the central hub.

9. A clutch drum assembly for use in a centrifugal clutch drum along and rotatable about a central axis for cooperating with at least one shoe mounted upon a rotatable router, the clutch drum assembly comprising:

a circular cylindrical portion;

an end wall;

a central hub;

the circular cylindrical portion oriented radially about and circumferentially extending around the rotor and the at least one shoe of the drive member, the circular cylindrical portion providing an inside surface which engages the at least one shoe coupling the drive member to the clutch drum when the drive member is rotated at sufficient speed to cause the at least one shoe to be urged radially outboard; and the end wall extending radially inward from the circular cylindrical portion and connected to the central hub, the end wall and the circular cylindrical portion integrally formed of a single metal sheet, the end wall provided with a plurality of vent openings circumferentially spaced about the central axis and a plurality of corresponding fan blades, each of the blades having a portion integrally joined to the end wall and extending axially outwardly from the end wall with the vent opening substantially covered axially by the fan blade, wherein rotation of the clutch drum causes the fan blade to induce cooling air to flow between the end wall and fan blades substantially parallel to the end wall and then through the vent openings.

10. The centrifugal clutch of claim 9 wherein said clutch drum circular cylindrical portion, end wall, central hub and plurality of fan blades are parts of a single metal sheet.

11. The centrifugal clutch of claim 9 wherein the fan blades extend axially outward of the end wall in a direction on the opposite side of the end wall as the circular cylindrical portion.

* * * * *